(12) United States Patent
Kang et al.

(10) Patent No.: US 10,193,905 B2
(45) Date of Patent: Jan. 29, 2019

(54) METHOD AND APPARATUS FOR ADAPTIVE CACHE MANAGEMENT

(71) Applicant: Samsung Electronics Co., Ltd., Gyeonggi-do (KR)

(72) Inventors: Byoungik Kang, Seoul (KR); Minsoo Kim, Seoul (KR); Wonjin Kim, Gyeonggi-do (KR); Philkoo Yeo, Seoul (KR); Sangchul Jung, Gyeonggi-do (KR); Taedong Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 8 days.

(21) Appl. No.: 15/255,469

(22) Filed: Sep. 2, 2016

(65) Prior Publication Data

US 2017/0070516 A1  Mar. 9, 2017

(30) Foreign Application Priority Data

Sep. 3, 2015 (KR) .................. 10-2015-0124892
Oct. 26, 2015 (KR) .................. 10-2015-0148932

(51) Int. Cl.
| | |
|---|---|
| *G06F 11/00* | (2006.01) |
| *H04L 29/06* | (2006.01) |
| *G06F 12/0813* | (2016.01) |
| *H04L 12/851* | (2013.01) |
| *H04W 84/10* | (2009.01) |
| *H04W 84/12* | (2009.01) |

(52) U.S. Cl.
CPC ...... *H04L 63/1416* (2013.01); *G06F 12/0813* (2013.01); *H04L 47/2441* (2013.01); *G06F 2212/154* (2013.01); *G06F 2212/60* (2013.01); *G06F 2212/62* (2013.01); *H04W 84/105* (2013.01); *H04W 84/12* (2013.01)

(58) Field of Classification Search
CPC .... H04L 63/1416; H04W 84/12; G06F 13/14; G06F 2212/154; G06F 2212/60; G06F 2212/62
USPC ....................................... 726/3, 23
See application file for complete search history.

(56) References Cited

U.S. PATENT DOCUMENTS

| | | | |
|---|---|---|---|
| 7,555,597 B2 | 6/2009 | Srivastava et al. | |
| 8,341,724 B1 * | 12/2012 | Burns | H04L 63/0428 370/235 |
| 8,572,717 B2 * | 10/2013 | Narayanaswamy | H04L 63/0245 726/12 |

(Continued)

FOREIGN PATENT DOCUMENTS

| | | |
|---|---|---|
| EP | 2 838 230 | 2/2015 |
| EP | 2 903 220 | 8/2015 |

OTHER PUBLICATIONS

International Search Report dated Dec. 20, 2016 issued in counterpart application No. PCT/KR2016/009857, 3 pages.

(Continued)

*Primary Examiner* — Samson B Lemma
(74) *Attorney, Agent, or Firm* — The Farrell Law Firm, P.C.

(57) ABSTRACT

An apparatus and a method for processing data are provided. The method for processing data by a terminal. The method includes identifying a plurality of inspection types for a packet; determining at least one inspection type from the plurality of inspection types for the packet based on a predetermined criterion; and processing the determined at least one inspection type for the packet.

14 Claims, 13 Drawing Sheets

(56) References Cited

U.S. PATENT DOCUMENTS

| | | | |
|---|---|---|---|
| 2008/0034416 A1* | 2/2008 | Kumar | H04L 63/0272 726/15 |
| 2010/0095367 A1* | 4/2010 | Narayanaswamy | H04L 63/0245 726/12 |
| 2010/0132031 A1* | 5/2010 | Zheng | H04L 63/0227 726/13 |
| 2010/0254399 A1 | 10/2010 | Shin et al. | |
| 2011/0125748 A1* | 5/2011 | Wood | G06F 17/30964 707/737 |
| 2012/0275323 A1 | 11/2012 | Reznik et al. | |
| 2013/0272144 A1* | 10/2013 | Dong | H04L 43/024 370/252 |
| 2013/0291088 A1 | 10/2013 | Shieh et al. | |
| 2014/0153435 A1 | 6/2014 | Rolette et al. | |
| 2014/0169367 A1 | 6/2014 | Tsym | |
| 2014/0233413 A1* | 8/2014 | Dahod | H04N 21/6131 370/252 |
| 2014/0334326 A1* | 11/2014 | Zhang | H04W 24/08 370/252 |
| 2015/0156083 A1* | 6/2015 | Ni | H04L 43/028 370/236 |

OTHER PUBLICATIONS

European Search Report dated Jul. 20, 2018 issued in counterpart application No. 16842359.8-1215, 8 pages.

* cited by examiner

METHOD AND APPARATUS FOR ADAPTIVE CACHE MANAGEMENT

PRIORITY

This application claims priority under 35 U.S.C. 119(a) to Korean Patent Application No. 10-2015-0124892, which was filed in the Korean Intellectual Property Office on Sep. 3, 2015 and Korean Patent Application No. 10-2015-0148932, which was filed in the Korean Intellectual Property Office on Oct. 26, 2015, the entire contents of each of which are incorporated herein by reference.

BACKGROUND

1. Field of the Disclosure

The present disclosure relates generally to a method and an apparatus for adaptive cache management.

2. Description of the Related Art

Recently, various mobile devices (which may be referred to by various terms, such as mobile apparatuses, end devices, and terminals), such as smart phones, tablets, and wearable devices, have appeared, and network devices (which may be referred to as various terms, such as network communication devices and communication devices) for performing network communication between the various mobile devices have become necessary. Further, with the development of the Internet of things (IoT), communication between surrounding things (i.e., surrounding devices) has also become necessary. Accordingly, the various mobile devices have supported not only Wi-Fi, which can also be referred to as Institute of Electrical and Electronics Engineers (IEEE) 802.11 standard technology, and $3^{rd}$ generation partnership project (3GPP) long term evolution (LTE) but also various network devices, such as Bluetooth, ZigBee, and near field communication (NFC), and would support much more network devices in future. Further, the number of users who use such network environments has gradually increased. Further, mobile devices include various Input/Output (I/O) units, such as a Universal Serial Bus (USB) and a Universal Flash Storage (UFS). In a broad sense, an I/O unit may include the above-described network device.

In order to use various pieces of content in mobile devices, users desire fast processing speed. Wi-Fi currently supports data transmission speed in the range of Mbps, but is expected to be improved so as to support data transmission speed in the range of Gbps in future. Further, the data transmission speed of the I/O unit has gradually increased in such a manner that the data transmission speed that is supported by cellular communication such as LTE has also been heightened.

In current mobile devices, however, data that is generated by a network device, such as a Wi-Fi or LTE device, and an I/O unit, and is transmitted or received at a high speed (hereinafter referred to as "high-speed data") is processed by a main central processing unit (CPU), which may be also be referred to as a "processor" herein. Since such a processing method causes a large amount of load to occur in the main CPU in a high-speed network environment, network performance may deteriorate, and heat generation and power consumption may be increased due to the excessive load of the main CPU. Presently, in order to address such problems, research for developing a network processing method for processing high-speed data has been actively performed.

SUMMARY

An aspect of the present disclosure is to address at least the above-described problems and provide at least the advantages described below.

In accordance with an aspect of the present disclosure, a method for processing data by a terminal is provided. The method includes identifying a plurality of inspection types for a packet; determining at least one inspection type from the plurality of inspection types for the packet based on a predetermined criterion; and processing the determined at least one inspection type for the packet.

In accordance with another aspect of the present disclosure, a terminal for processing data is provided. The terminal includes a transceiver configured to transmit and receive a signal; and a controller configured to identify a plurality of inspection types for a packet; determine at least one inspection type from the plurality of inspection types for the packet based on a predetermined criterion; and process the determined at least one inspection type for the packet.

According to the disclosure, the cache and the memory can be effectively used on the basis of the network state, the device state, and the information related to the I/O unit.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION

Figure 1:
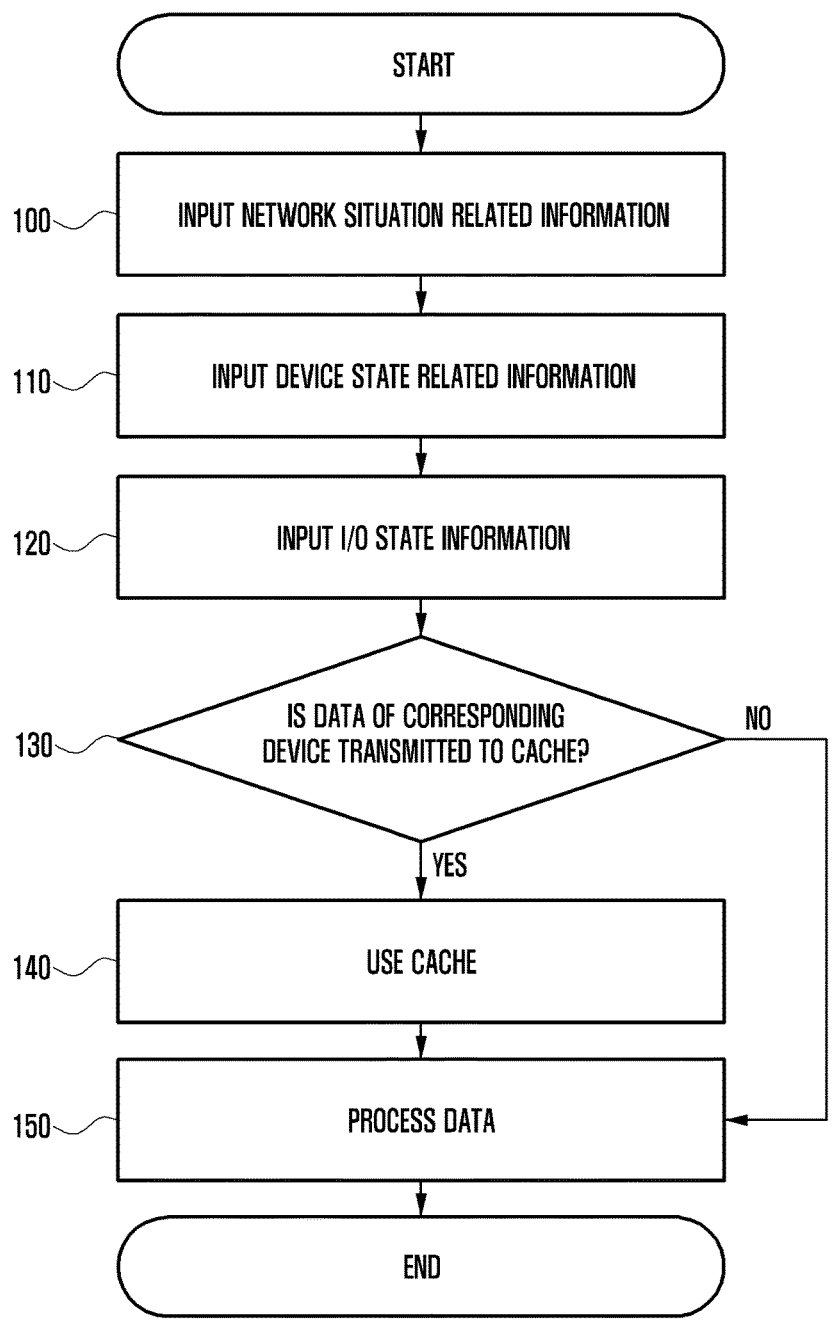
FIG. 1 is a diagram illustrating the overall operation of an apparatus according to an embodiment of the present disclosure.

Hereinafter, embodiments of the present disclosure are described in detail with reference to the accompanying drawings. In the following disclosure, descriptions of related well-known functions or configurations incorporated herein may be omitted when such a description may obscure the subject matter of the present disclosure in unnecessary detail. Further, terms to be described later are defined in consideration of their functions in the present disclosure, but may differ depending on intentions of a user and an operator or customs. Accordingly, terms used herein should be defined on the basis of the contents of the entire description of the present disclosure.

Further, embodiments of the present disclosure can be applied to other communication systems adopting similar technical backgrounds and channel types with slight modifications within a range that does not greatly deviate from the scope of the present disclosure, according to a person skilled in the art to which the present disclosure pertains.

The aspects and features of the present disclosure and methods for achieving these aspects and features will be apparent by referring to the embodiments described in detail herein with reference to the accompanying drawings. However, the present disclosure is not limited to the embodiments disclosed hereinafter, but can be implemented in diverse forms. Matters defined in the following detailed description, such as the detailed construction and elements, are merely specific details provided to assist those of ordinary skill in the art in a comprehensive understanding of the disclosure, and the present disclosure is only defined by the scope of the appended claims and their equivalents. In the following description of the present disclosure, the same drawing reference numerals are used for the same or similar elements across various figures.

Each block of flowchart illustrations and combinations of blocks in the flowchart illustrations can be implemented at least in part by computer program instructions. Since these computer program instructions can be provided to a processor of a general purpose computer, special purpose computer, or other programmable data processing equipment, the instructions, which are executed through the processor of the computer or other programmable data processing equipment, create means for implementing the functions specified in the flowchart block or blocks. Since these computer program instructions may also be stored in a computer-usable or computer-readable memory that can direct the computer or other programmable data processing equipment to function in a particular manner, the instructions stored in the computer-usable or computer-readable memory can produce an article of manufacture including instruction means that implement the function specified in the flowchart block or blocks. Since the computer program instructions may also be loaded onto a computer or other programmable data processing equipment, a series of operational steps may be performed on the computer or other programmable data processing equipment to produce a computer implemented process such that the instructions that are executed on the computer or other programmable data processing equipment can provide steps for implementing the functions specified in the flowchart block or blocks. Further, each block of the flowchart illustrations may represent a module, segment, or portion of code, which includes one or more executable instructions for implementing the specified logical function(s). Further, in some alternative implementations of embodiments of the present disclosure, the functions noted in the blocks may occur in a different order than the order depicted in the flowchart. For example, two blocks shown in succession may in fact be executed substantially concurrently or the blocks may sometimes be executed in the reverse order, depending upon the functionality involved.

The term "unit", as used herein, may refer to, but is not limited to, a software or hardware component, such as a field-programmable gate array (FPGA) or an application specific integrated circuit (ASIC), which performs certain tasks. However, a unit is not limited to software or hardware. A unit may be configured to reside on the addressable storage medium and configured to execute on one or more processors. Thus, a unit may include, for example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units according to embodiments of the present disclosure may be combined into fewer components and units, or may be further separated into additional components and units. In addition, components and units may be implemented to reproduce one or more CPUs in a device or a secure multimedia card.

A method for processing input/output (I/O) data exerts a great influence on the data processing performance, and technology that has been studied to process the I/O data is described as follows. For example, data stored in a memory may be transmitted to a cache, and the data that is transmitted to the cache may be processed through a CPU. In this case, an I/O adapter can directly access the memory using a Direct Memory Access (DMA) technology. Accordingly, if the DMA technology is used, data is directly stored in the memory, and thus the burden of the CPU can be reduced. However, the processor should continuously access the stored data in order to obtain the stored data, and if the processor is used to transmit the data to the memory, the performance of the processor deteriorates. Further, according to the DMA technology, I/O data is directly transmitted to the memory, and thus the performance deterioration of the CPU can be reduced. However, the usage of the DMA technology may be problematic due to consumption of time required to store the data in the memory, time required to bring the stored memory to the cache through a bus, and time required for the processor to process the data in the cache.

In order to address this problem of time consumption, a Direct Cache Access (DCA) technology has been developed. The processor may include a cache that can store the data for fast access thereto. The cache is a memory that is installed to achieve fast access to the system memory. The data that is transmitted from the I/O unit may be directly transmitted to the cache, and such a DCA technology can reduce an access standby time of the system memory and increase the data processing speed, since the data of the corresponding I/O unit is directly transmitted to the cache to be processed by the processor.

However, if it is necessary to simultaneously process data of other I/O units, or there is any application that is under operation while using the DCA technology, the cache, which has a limited capacity, may be used in a divided manner, and this divided usage lowers the overall processing speed. Further, when various I/O units exist and data of such devices are simultaneously processed, the data processing performance may be lowered for the same reasons.

When using a high-speed I/O unit according to the related art, a hardware accelerator or a software accelerator for heightening the corresponding data processing speed has been primarily used, in order to quickly process input/output data. However, such a method is insufficient to process the data of the current I/O unit of which the data processing speed has been considerably heightened.

In order to address a problem in which the performance of an application that is under operation deteriorates and the data processing speed of a high-speed I/O unit becomes lowered in the existing DCA technology, a method and apparatus according to a first embodiment of the present disclosure is provided. The method and apparatus are used for determining the data priority using information related to a network situation, information related to a device state, and information related to an I/O state and transmit the data to a cache or a memory based on the determined priority. In particular, such a method may be effective for efficient processing of the data of the high-speed I/O unit.

FIG. 1 is a diagram illustrating the overall operation of an apparatus according to an embodiment of the present disclosure.

Referring to FIG. 1, a global adaptive cache management (described in more detail herein with reference to FIGS. 2 and 5) receives information related to a network situation, in step 100, and then receives information related to a device state, in step 110. Thereafter, the global adaptive cache management receives information related to an I/O state, in step 120. The global adaptive cache management determines whether to transmit data of a corresponding I/O unit to a cache, that is, whether to process the data as high-speed data, based on the received network situation related information, device state related information, and I/O state information, in step 130. If the apparatus determines to process the data of the corresponding I/O unit as high-speed data, the global adaptive cache management transmits the data to the cache and stores the data in the cache to process the data, in step 140, and the method proceeds to processing of the data in step 150. However, if the apparatus does not determine to process the data of the corresponding I/O unit as high-speed data, the global adaptive cache management transmits the data to a memory and stores the data in the memory to process the data in step 150, in the same manner as in methods according to the related art.

Figure 2:
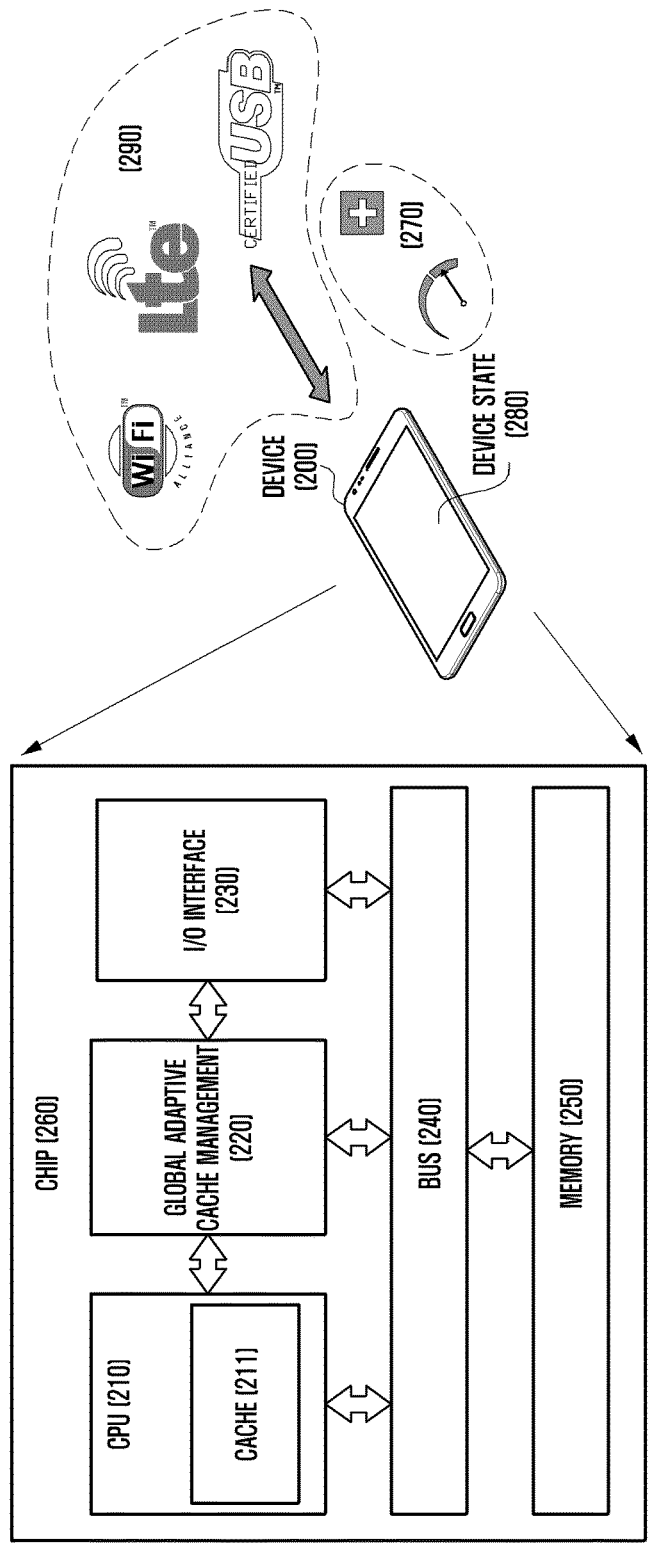
FIG. 2 is a diagram illustrating an element that determines whether to transmit data to a cache, that is, whether to process the data as high-speed data according to an embodiment of the present disclosure.

FIG. 2 is a diagram illustrating an element that determines whether to transmit data to a cache, that is, whether to process the data as high-speed data according to an embodiment of the present disclosure.

Referring to FIG. 2, a chip 260 of a mobile device 200 includes a CPU 210, a global adaptive cache management 220, an I/O interface 230, a bus 240, and a memory 250. The CPU 210 includes a cache 211.

The global adaptive cache management 220 determines whether to process data of an I/O unit as high-speed data, that is, determines the data priority, in accordance with a network situation 270. More specifically, if the input/output data is emergency data, data related to an emergency situation, or data related to life and medical fields, the global adaptive cache management 220 may determine to preferentially process the corresponding data. Further, the global adaptive cache management 220 may determine whether to process the data as high-speed data in consideration of the communication state and congestion rate of a transceiver.

Further, the global adaptive cache management 220 may determine the priority for data processing in accordance with a device state 280. For example, the global adaptive cache management 220 may determine the usage rate of a processor and whether a processor is in an idle state using information of the processor, and may determine the priority for data processing using battery usage rate information and battery usable time information of a device.

Further, the global adaptive cache management 220 may determine the priority for data processing in consideration of the state 290 of an I/O unit, such as Wi-Fi, universal serial bus (USB), UFS, or LTE. The global adaptive cache management 220 may determine the data priority using usage information of an I/O unit being used, the maximum input/output speed, an average input/output speed, and an actual input/output speed.

Further, the chip 260 can be run/executed as hardware, but this is merely an example according to a particular embodiment, and the chip 260 can be run/executed as a program or software in accordance with embodiments of the present disclosure.

Figure 3:
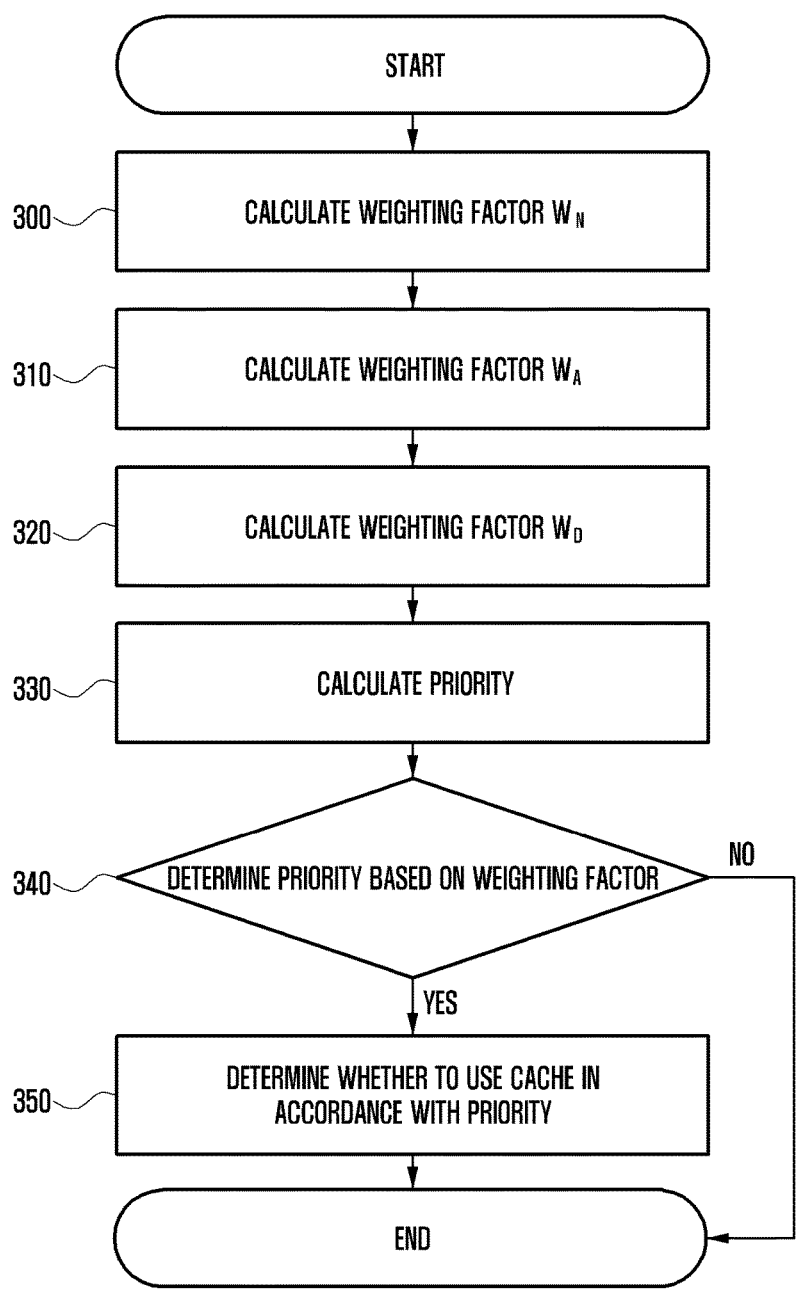
FIG. 3 is a diagram illustrating in detail an example of adaptive cache usage in detail according to an embodiment of the present disclosure.

FIG. 3 is a diagram illustrating in detail an example of adaptive cache usage according to an embodiment of the present disclosure.

Referring to FIG. 3, the global adaptive cache management calculates a weighting factor $W_N$ based on network situation related information, in step 300. Further, the global adaptive cache management calculates a weighting factor $W_A$ based on device state related information, in step 310. Thereafter, the global adaptive cache management calculates a weighting factor $W_D$ based on state information of an I/O unit, in step 320. The global adaptive cache management calculates the synthetic priority based on the weighting factors $W_A$, $W_N$, and $W_D$, in step 330, determines the priority through comparison, in step 340, and determines whether to use the cache in accordance with the priority, in step 350. In this case, the global adaptive cache management may calculate the priority for I/O data for each I/O unit, or may calculate the priority for the corresponding data for each application.

The weighting factor $W_N$ may be predetermined in accordance with the network situation. For example, when the input/output data is emergency data or data related to an emergency situation, the global adaptive cache management may apply a predetermined $W_N$ value to the emergency data or the data related to an emergency situation that is higher than values applied to other kinds of data. Further, when the input/output data related to life and medical fields, the global adaptive cache management may apply a predetermined $W_N$ value to the data related to life and medical fields that is higher than values applied to other kinds of data. The $W_N$ values for such network information may be predetermined and stored in a memory in the form of a table.

The weighting factor $W_A$ may be determined on the basis of a device state, that is, the usage rate of a processor and whether a processor is in an idle state, battery usage rate information of a device, and battery usable time information of a device. For example, a method for determining a weighting factor based on the usage rate of a processor in accordance with an embodiment of the present disclosure is described as follows.

A method for calculating a weighting factor $W_A$ based on the usage rate of a processor is expressed as in Equation (1) below.

$$W_A = \sum_{All} W_{Ax} = \sum_{All} T \frac{T_{Ax}}{T_{Processor-busy}} \quad (1)$$

Here, $W_A$ denotes a weighting factor of the processor usage rate of application X, $T_{AX}$ denotes a CPU usage time of application X, and $T_{Processor-busy}$ denotes the whole time in which a processor is used (the whole time in which a processor is driven). Through calculation of $W_A$, the weighting factor can be calculated using the usage time of the corresponding application against the processor usage rate. For example, if a long period of time is used for a specific application during the CPU driving time, that is, if a specific application uses the CPU for a long time, the global adaptive cache management may determine to transmit corresponding data to a cache for fast data processing. In addition, for determination of $W_A$, rules may be predetermined to give a weight value to an operating foreground application, to give a weight value to a specific application or a specific I/O unit by a user, or to give a weight value to a specific application or a specific I/O unit based on application execution history information by a system. In accordance with such rules, $W_A$ may be determined.

Further, the weighting factor $W_D$ may be determined using information on whether an I/O unit is in use, the maximum input/output speed, an average input/output speed, and an actual input/output speed. For example, a method for determining a weighting factor based on the data input/output speed of an I/O unit in accordance with an embodiment of the present disclosure is described as follows.

A method for calculating a weighting factor $W_D$ based on the input/output speed of an I/O unit is expressed as in Equation (2) below. Here, Max $\{S_{DY}\}$ denotes the maximum performance (input/output speed) of a specific I/O unit, and $S_{DY}$ denotes the current performance of a specific I/O unit.

$$W_D = \sum_{All} W_{Dy} = \sum_{All} \frac{S_{Dy}}{\max\{S_{Dy}\}} \quad (2)$$

Further, in order to calculate $W_D$, Equation (3) for calculating the speed of a specific I/O unit against the speeds of the whole I/O units may be referred to. All denotes a sum of performances of all I/O units for a specific time, and sigma_all $W_{Dy}$ denotes a sum of performances of an I/O unit Y for a specific time.

$$M_D = \operatorname{mean}\{W_D\} \frac{\sum_{All} W_{Dy}}{All} \quad (3)$$

The global adaptive cache management may finally determine $W_D$ to be the current performance against the maximum performance of an I/O unit calculated according to Equation (2) or based on MD that is a relative performance of a specific I/O unit.

Further, the global adaptive cache management may determine which I/O unit each application uses (or which application a certain I/O unit uses). Such information may be set by a user, and the system or the operating system of a mobile device may automatically set such information using usage information of an application and an I/O unit. The priority for each I/O unit to use a cache may be determined using such information and the weighting factor calculated in the above-described method. Table 1 below indicates a method for determining a priority for each I/O unit.

TABLE 1

| | Priority Determination | | | |
|---|---|---|---|---|
| | App 1 | App 2 | App 3 | ... Total |
| No Dev | 0 | 0 | $1 + W_{N3}W_{A3}M_D$ | $\Sigma$ No Dev = $1 + W_{N3}W_{A3}M_D$ |
| Dev 1 | $1 + W_{N1}W_{A1}M_{D1}$ | 0 | 0 | $\Sigma$ Dev 1 = $1 + W_{N1}W_{A1}W_{D1}$ |
| Dev 2 | 0 | $1 + W_{N2}W_{A2}M_{D2}$ | 0 | $\Sigma$ Dev 2 = $1 + W_{N2}W_{A2}W_{D2}$ |
| Dev 3 | 0 | $1 + W_{N2}W_{A2}M_{D3}$ | 0 | $\Sigma$ Dev 3 = $1 + W_{N3}W_{A2}W_{D3}$ |
| ... | | | | $\Sigma$ ... |

Table 1 shows a method for calculating a priority for each I/O unit, in which weighting factors are calculated for applications that are used by respective I/O units, and priorities for respective applications, which are calculated on the basis of the weighting factors, are added for one I/O unit. A method that is similar to the above-described method may be used to derive a priority for each application. As the priority of information that is calculated in Table 1 increases, the global adaptive cache management may give higher priority.

If it is determined that high-speed data processing is required for specific data based on the priority that is determined as in Table 1, the global adaptive cache management transmits the data to the cache.

Figure 4:
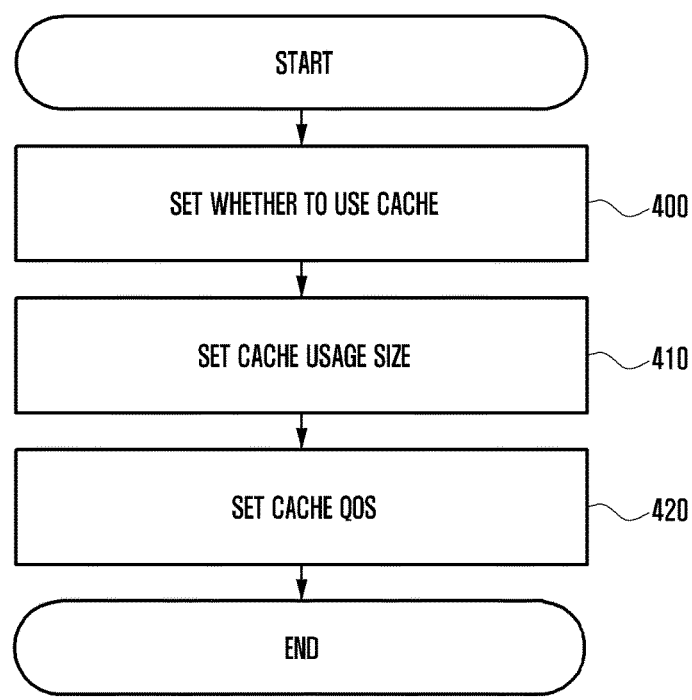
FIG. 4 is a diagram illustrating a method for a global adaptive cache management to set a cache according to an embodiment of the present disclosure.

FIG. 4 is a diagram illustrating a method for a global adaptive cache management to set a cache according to an embodiment of the present disclosure.

Referring to FIG. 4, in the case of transmitting data to a cache, the global adaptive cache management may set whether to use the cache in step 400, set the cache usage size in step 410, and set the quality of service (QoS) of the cache in step 420, to process the corresponding data transmitted to the cache. The global adaptive cache management may set the cache usage to "YES", and may set the cache usage size and the QoS in accordance with the data that is transmitted to the cache.

Figure 5:
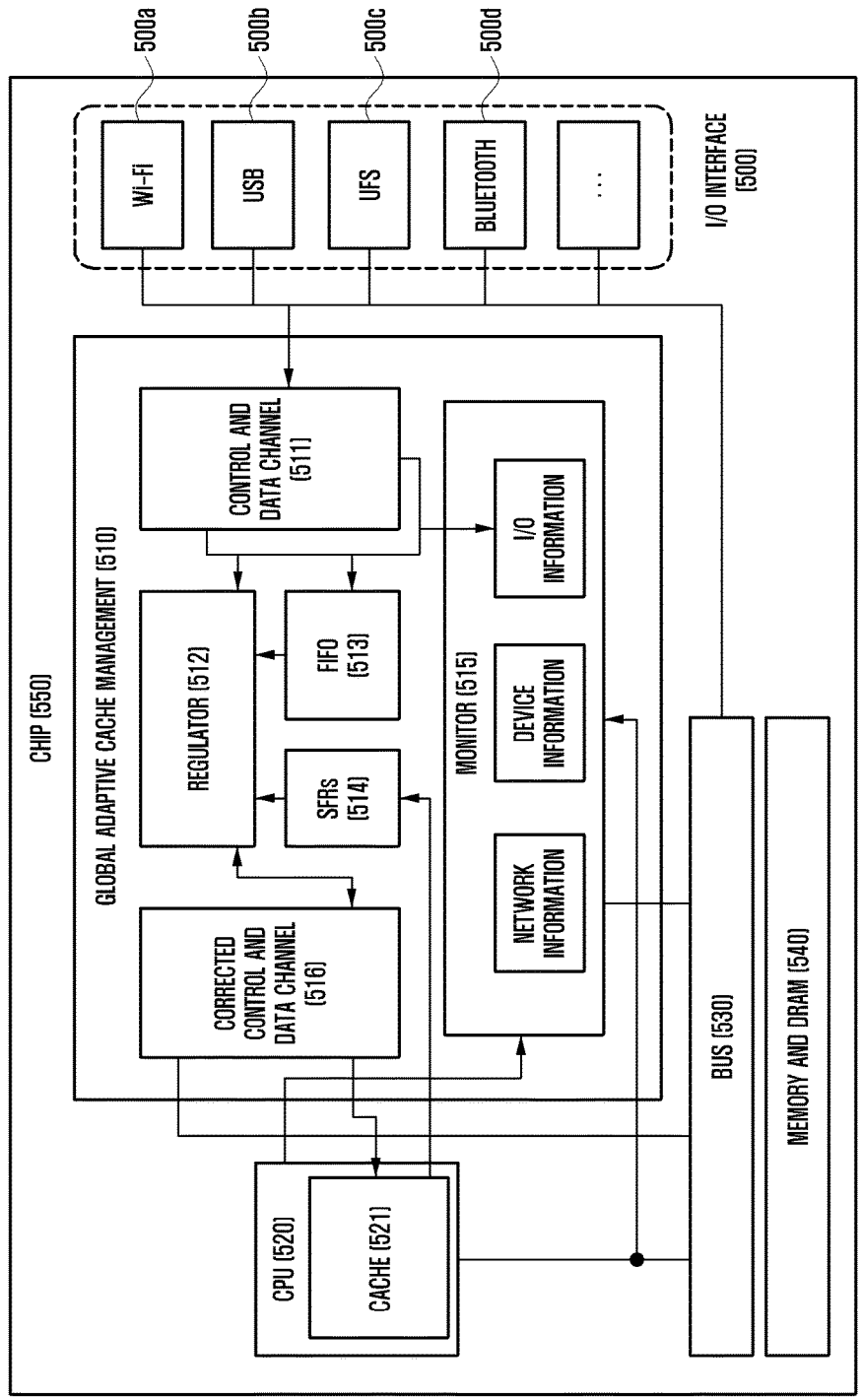
FIG. 5 is a block diagram illustrating an apparatus proposed according to an embodiment of the present disclosure.

FIG. 5 is a block diagram illustrating an apparatus according to an embodiment of the present disclosure.

Referring to FIG. 5, a chip 550 includes an I/O interface 500, a global adaptive cache management 510, a CPU 520, a bus 530, and combination of a memory and a dynamic random access memory (DRAM) 540. Hereinafter, the combination of the memory and the DRAM 540 is referred to as "memory 540." The I/O interface is connected to the global adaptive cache management 510, the CPU 520 is connected to the global adaptive cache management 510 and the bus 530, and the bus 530 is connected to the memory 540 and the global adaptive cache management 510. The global adaptive cache management 510 includes a control and data channel 511, a regulator 512, special function registers (SFRs) 514, a first in first out (FIFO) 513, a corrected control and data channel 516, and a monitor 515.

Through the I/O interface 500, which includes, for example, a Wi-Fi interface 500a, a USB interface 500b, a UFS interface 500c, and a Bluetooth interface 500d, a control signal and a data signal of a corresponding I/O unit are transmitted via the control and data channel The control signal and the data signal are stored in the FIFO 513. The monitor 515 receives and processes information related to a network situation, information related to a device state, and state information of the I/O device as described above. Such information may be transmitted from the CPU 520 and the bus 530. Based on the network situation related information, the device state related information, and the I/O unit state information, the regulator determines whether the transmitted data is data of a high-speed I/O unit and the priority through a data processing method described herein according to an embodiment of the present disclosure. The regulator 512 corrects the control signal and the data signal based on the result of the determination, and transmits the data of the corresponding I/O device directly to the cache 521 or the memory 540 through the corrected control and data channel 516.

Figure 6:
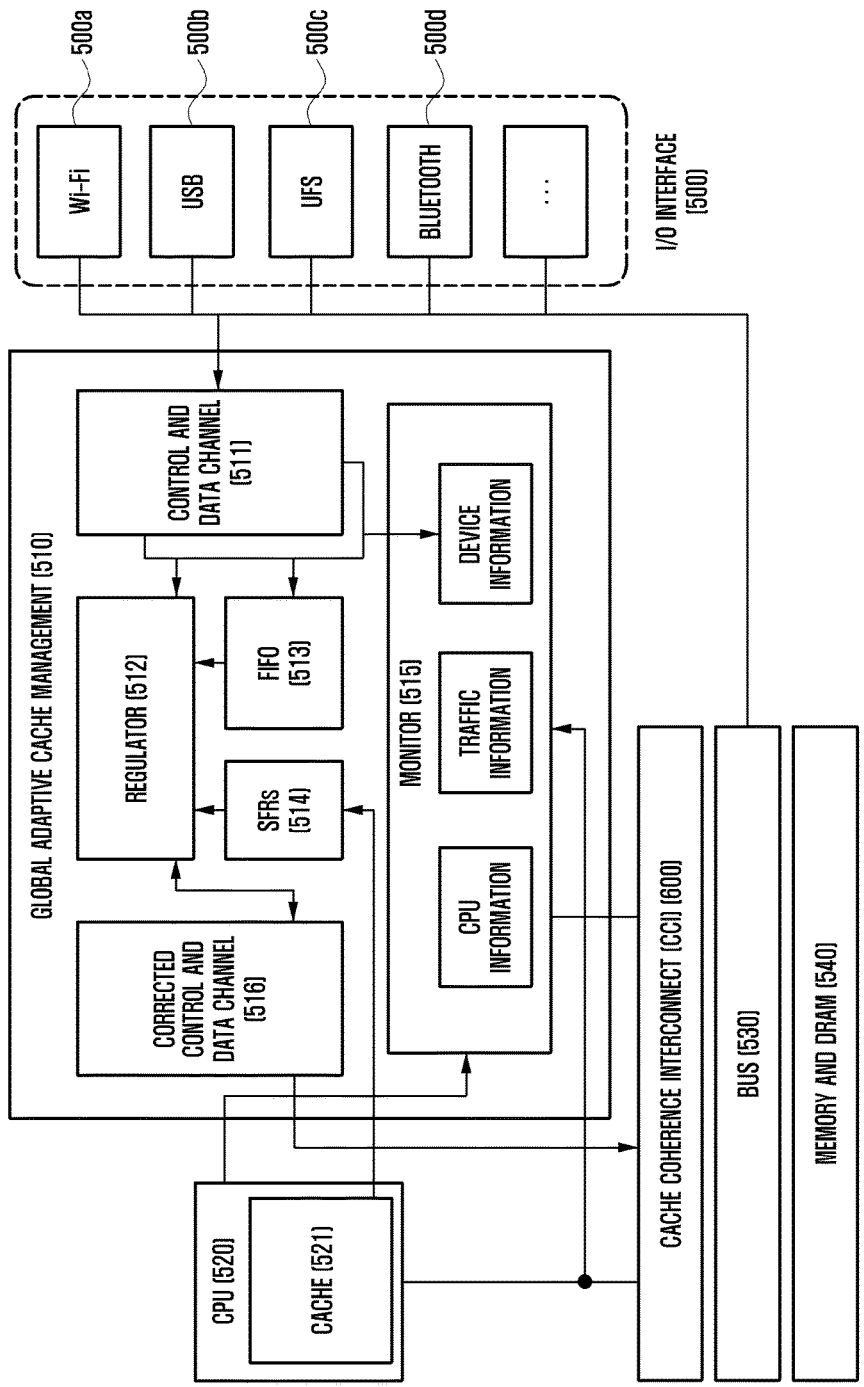
FIG. 6 is a block diagram illustrating an example of another apparatus according to an embodiment of the present disclosure.

FIG. 6 is a block diagram illustrating an example of another apparatus according to an embodiment of the present disclosure.

Referring to FIG. 6, the apparatus of FIG. 6 is different from the structure of FIG. 5 on the point that it further includes a Cache Coherent Interconnect (CCI) 600. The CCI 600 is an interconnect that provides cache coherence in a multi-core system, and is connected to the bus 530 and the global adaptive cache management 510.

The control and data signals that are corrected by the global adaptive cache management 510 are transmitted to the CCI 600 through the corrected control and data channel 516, and the corresponding data is transmitted to the cache 521 or the memory 540 in accordance with the priority for the data that is determined by the regulator.

Figure 7:
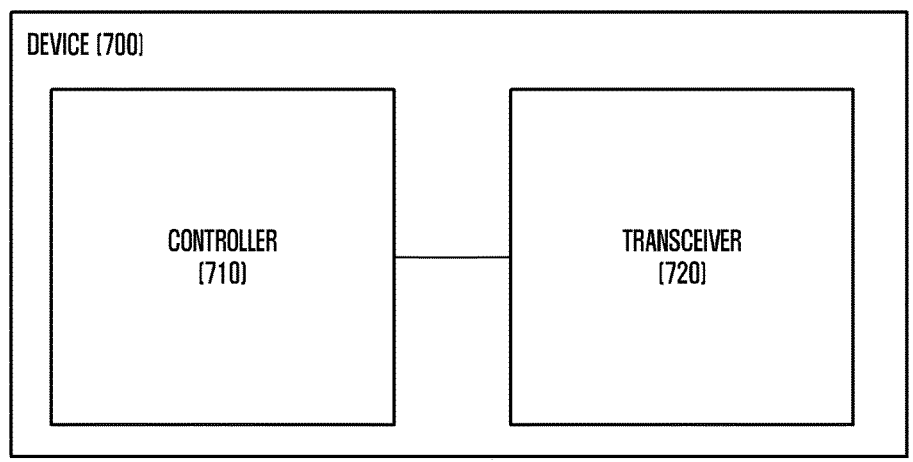
FIG. 7 is a block diagram illustrating an example of still another apparatus according to an embodiment of the present disclosure.

FIG. 7 is a block diagram illustrating an example of still another apparatus according to an embodiment of the present disclosure.

Referring to FIG. 7, a mobile device 700 according to an embodiment of the present disclosure includes a controller 710 and a transceiver 720. The I/O interface 500, the global adaptive cache management 510, the CPU 520, the bus 530, the memory, and the DRAM 540 as illustrated in FIGS. 5 and 6 may be included in the controller of FIG. 7. In the same manner as in FIGS. 5 and 6, the I/O interface 500 with respect to the embodiment corresponding to FIG. 7 is connected to the global adaptive cache management 510, the CPU 520 is connected to the global adaptive cache management 510 and the bus 530, and the bus 530 is connected to the memory 540 and the global adaptive cache management 510. The global adaptive cache management 510 may include the control and data channel 511, the regulator 512, the SFRs 514, the FIFO 513, the corrected control and data channel 516, and the monitor 515. The transceiver 720 may include one or more I/O units.

An aspect of the present disclosure provides a method to improve the processing performance of data of a current I/O unit having remarkably fast data transmission speed and packets (hereinafter referred to as "network packets", which may be interpreted to include the data of the I/O unit) that are transmitted and received through a network. The network packets pass through various inspections in their transmission and reception processes. Examples of such inspections may be packet error inspection, security vulnerability inspection, connection information inspection, and address (Internet Protocol version 4 (IPv4), Internet Protocol version 6 (IPv6), and media access control (MAC) address) inspection, and the memory and/or the control unit manage the inspection policy and inspection rule/table for this. In the related art, the above-described inspections are successively performed with respect to all transmitted/received network packets, and this causes the network speed to deteriorate.

An aspect of the present disclosure is to reduce overhead by selectively inspecting the network packets through recognition of user scenarios and mobile device states, and to improve the network speed through the overhead reduction.

The present disclosure relates to selection of inspection types to be applied to the respective network packets through storage/management of connection device information, user scenarios, and inspection types. The selected inspection types can be processed successively or in parallel, and for this, various operation devices may be used.

Figure 8:
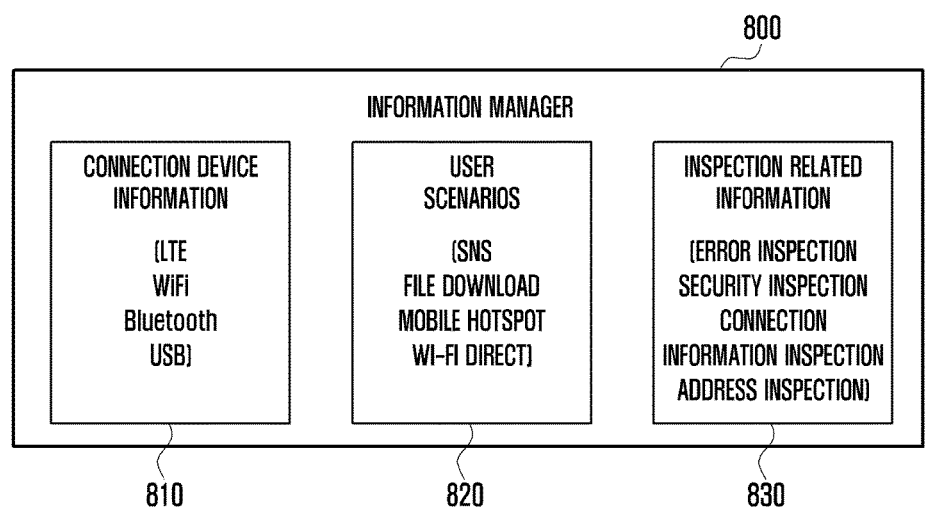
FIG. 8 is a diagram illustrating an information manager for selecting an inspection type according to an embodiment of the present disclosure.

FIG. 8 is a diagram illustrating an information manager for selecting an inspection type according to an embodiment of the present disclosure.

Referring to FIG. 8, an information manager 800, which is a unit for selecting an inspection type for network packets, stores and manages connection device information 810, user scenarios 820, and inspection related information 830. In the connection device information 810, network information that can be used by a mobile device, such as LTE, Wi-Fi, Bluetooth, and USB, may be stored and managed. In the user scenarios 820, related information on which user scenario transmits/receives packets that are transmitted/received using a network may be stored and managed. As examples of the user scenarios 820, the mobile device may transmit/receive packets using the network through the usage of user's social networking service (SNS), file download, mobile hotspot, and Wi-Fi direct. Further, the inspection related information 830 includes information on an error inspection, security inspection, connection information inspection, and address inspection, which the network packets should pass through.

Figure 9:
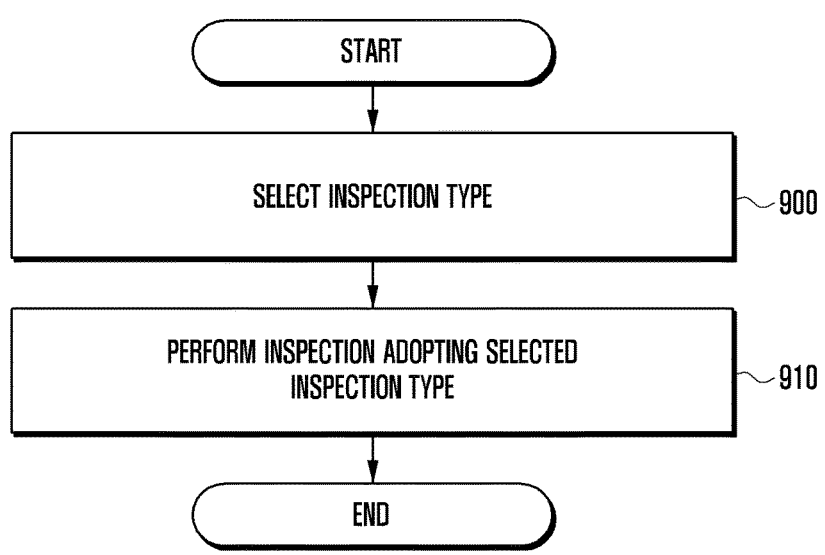
FIG. 9 is a diagram illustrating a method for an information manager to selectively perform a network packet inspection according to an embodiment of the present disclosure.

FIG. 9 is a diagram illustrating a method for an information manager to selectively perform a network packet inspection according to an embodiment of the present disclosure.

Referring to FIGS. 8 and 9, the information manager 800 selects the inspection type to be performed with respect to the network packet, in step 900. The selection may be performed in consideration of the connection device information and the user scenarios. Selection of the inspection type may be understood to have the same definition as registration of a filtering function required for the inspection and execution of the filtering function. For example, an error inspection may be performed with respect to the network packet, and if an error is detected, the error inspection and the security inspection may be re-performed. As a result, a re-inspection to determine whether the error-detected packet is a packet having a security problem can be performed. Further, when transmitting/receiving an SNS related network packet using an LTE network, the information manager may not select to perform both the IPv4 address inspection and the IPv6 address inspection, but may select to perform only the IPv6 address inspection. Further, when transmitting/receiving an SNS related network packet using a Wi-Fi network, the information manager may select to perform only the IPv4 address inspection. This selection is performed because IPv6 is mainly used for the LTE network and IPv4 is mainly used for the Wi-Fi network. Even for the above-described example, the information manager may select to perform only the address inspection of the type that is used in the network. Further, when transmitting/receiving a packet in accordance with Wi-Fi direct, the packet is directly transmitted/received through the user selection. In this case, there is little room for the security problem that occurs in the network packet, and thus a selection to forego the security inspection is not performed with respect to the network packet may be performed. Further, when transmitting/receiving a packet according to a mobile hotspot using an LTE/Wi-Fi network, a selection to add the connection information inspection with respect to the packet may be performed.

Further, in order to reduce frequent changes of inspection types in accordance with the inspection type selection and overhead due to such changes when the inspection types are selected, the information manager 800 may operate to change the inspection types through determination of a duration or period. As an example, the information manager 800 may determine not to select the inspection type during a specific duration or period with respect to the network packet using LTE, but to apply the inspection type that has already been selected and performed.

Thereafter, the information manager 800, which has selected the inspection type to be performed, operates to perform the inspection through application of the selected inspection type, in step 910. In this case, the information manager 800 may operate to perform the inspection during the packet transmission/reception through loading of the selected inspection type (e.g., loading of module type related filtering function in the memory). This method has the advantages compared to the related art in that only necessary inspections are performed with respect to the packet, and thus the packet processing time can be shortened to cause unnecessary memory consumption to be reduced. The inspection types that are excluded due to the inspection type change may be uploaded from the memory to be excluded from the inspection types. When several kinds of packets are simultaneously transmitted/received, it is also possible to apply different inspection types to the packets through an app (process ID (PID) may be used to discriminate which application the network packet is related to) being used and source/destination port information.

Figure 10:
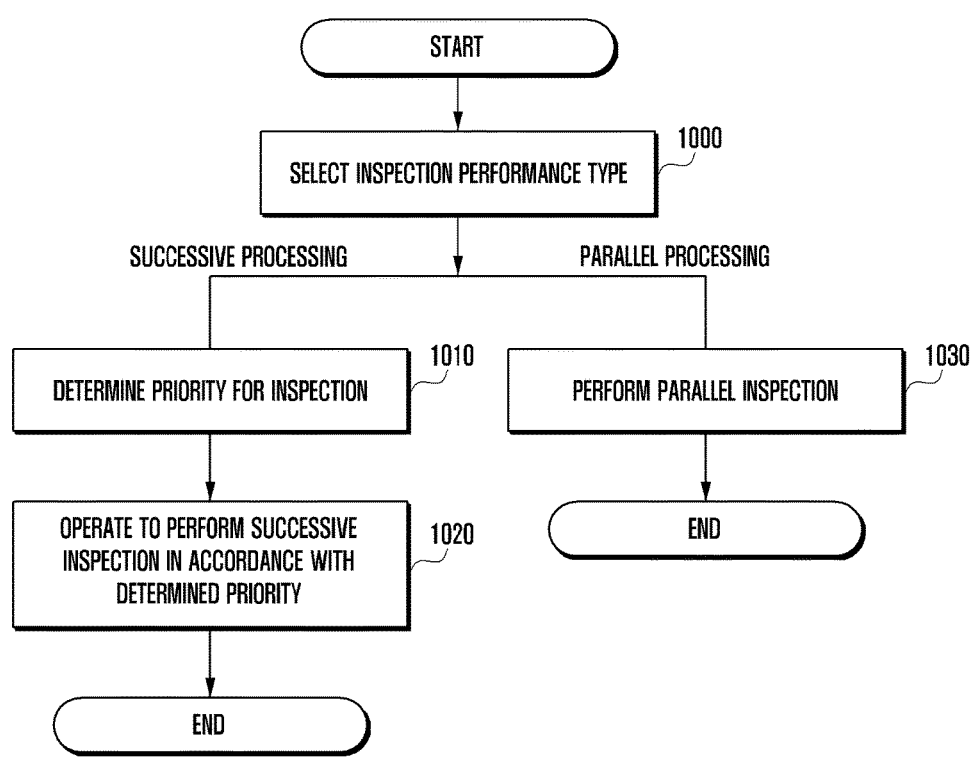
FIG. 10 is a diagram illustrating a method for an information manager to perform a network packet inspection in the case where several inspection types are selected according to an embodiment of the present disclosure.

FIG. 10 is a diagram illustrating a method for an information manager to perform a network packet inspection in the case where several inspection types are selected according to an embodiment the present disclosure. FIG. 10 illustrates a method for performing inspections successively or in parallel when several inspection types are selected.

Referring to FIGS. 8 and 10, when several inspections should be performed, the information manager selects a type to perform the inspection, in step 1000. The information manager 800 may select a successive processing or parallel processing. In this case, the information manager 800 may select the successive processing or parallel processing in consideration of whether an operation resource that can process inspections in parallel exists, whether a device having an operation resource that can process inspections in parallel exists, whether another application uses an operation resource, and a packet size. Further, in this process, the priority in accordance with emergency of the packet may be considered. If the successive processing is selected, the information manager 800 determines the priority for the inspection, in step 1010. Specifically, the information manager 800 may heighten a probability of detection of whether the packet is abnormal in the early stage of the inspection through determination of the priority for the inspection type in accordance with the usage scenario. For example, if the security vulnerability becomes great, such as when using public Wi-Fi outside, the priority for the security inspection among several inspections may be heightened to preferentially perform the security inspection, and thus the probability of discovery of the packet problem in the early stage of the inspection can be increased. Thereafter, the information manager 800 operates to perform the successive inspection based on the determined priority.

If parallel processing is selected, the information manager 800 performs several inspections in parallel using several operation devices, in step 1030. In this case, the information manager can operate to perform several inspections in parallel using a multi-core CPU, an operation device suitable to the parallel processing (e.g., graphic process unit (GPU), a digital signal processor (DSP), or a dedicated hardware device.

Figure 11:
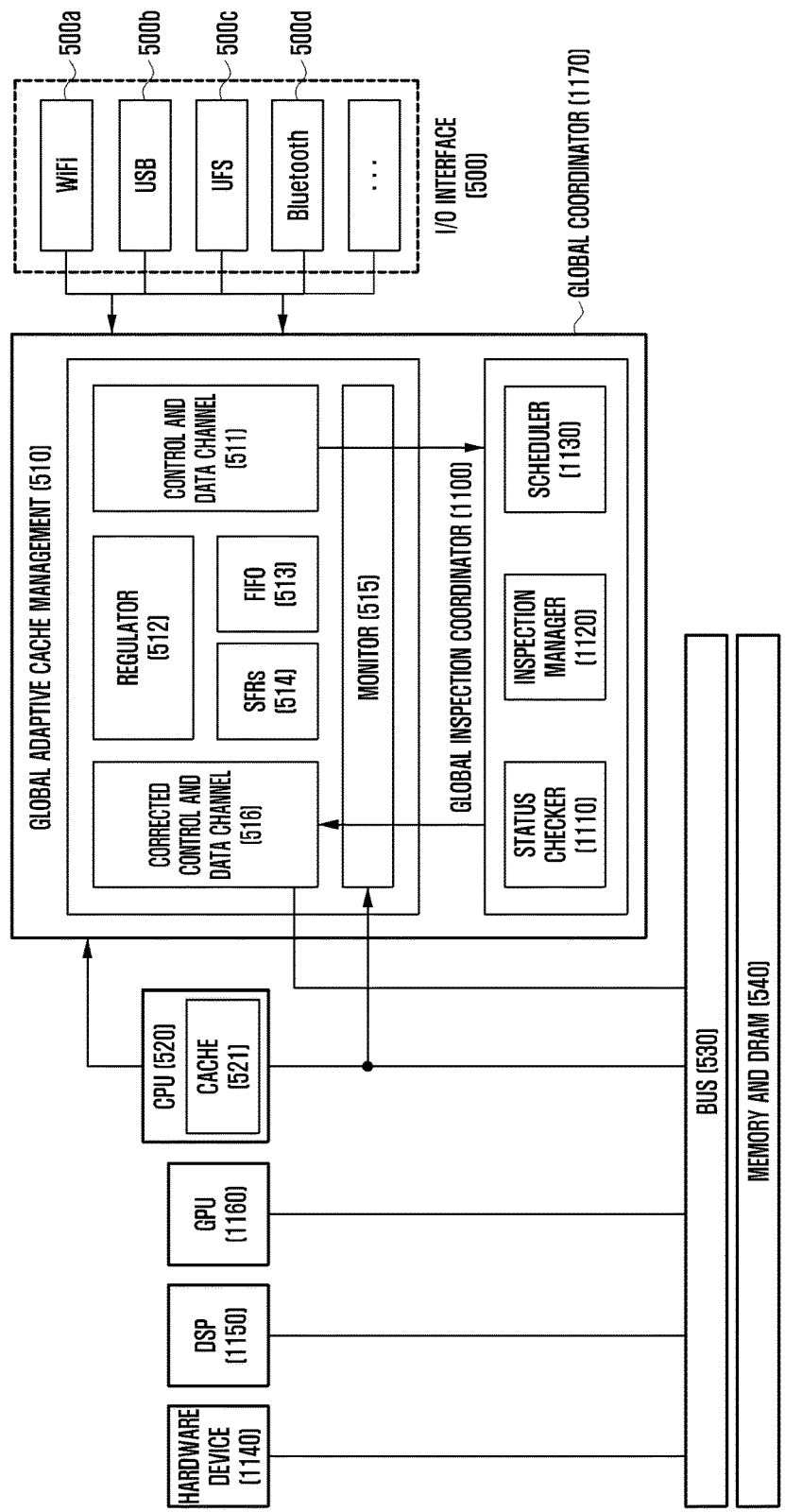
FIG. 11 is a block diagram illustrating an apparatus according to an embodiment of the present disclosure.

FIG. 11 is a block diagram illustrating an apparatus according to an embodiment of the present disclosure.

FIG. 11 illustrates an apparatus that is obtained by adding a global inspection coordinator 1100, a hardware device 1140 for parallel processing of several inspections, a DSP 1150, and GPU 1160 to the apparatus of FIG. 5.

The I/O interface 500, includes, for example, Wi-Fi control interface 500a, a USB control interface 500b, a UFS control interface 500c, and a Bluetooth control interface 500d Specifically, the global inspection coordinator 1170 is connected to the control and data channel 511 and the corrected data channel 516. The global inspection coordinator 1170 includes a status checker 1110, an inspection manager 1120, and a scheduler (i.e., job scheduler) 1130. The status checker 1110 may check statuses of an application and a mobile device, and the inspection manager 1120 may select any inspection to be performed on the basis of the status information of the application and the mobile device and connection device information 810, user scenarios 820, and inspection related information 830. The scheduler 1130 may determine whether to process one or more inspections successively or in parallel, and may perform the inspection accordingly. Further, the scheduler 1130 may determine the priority in accordance with the processing type for several inspections determined by the inspection manager 1120, and may control a multi-core CPU, a hardware device, a DSP, and a GPU to perform successive inspection or parallel inspection in accordance with the determined priority. The information manager 800 as described above may correspond to the global inspection coordinator 1110 of FIG. 11 or the inspection manager 1120 of FIG. 11. As shown in FIG. 11, a combination of the global inspection coordinator 1100 and the global adaptive cache management 510 may be referred to as a global coordinator 1170, which is connected to the CPU 520 and the bus 530. The corrected control and data channel 516 in FIG. 5 may be connected to the cache 521 and the bus. Further, the apparatus of FIG. 11 may be used when the selective inspection is performed.

Figure 12:
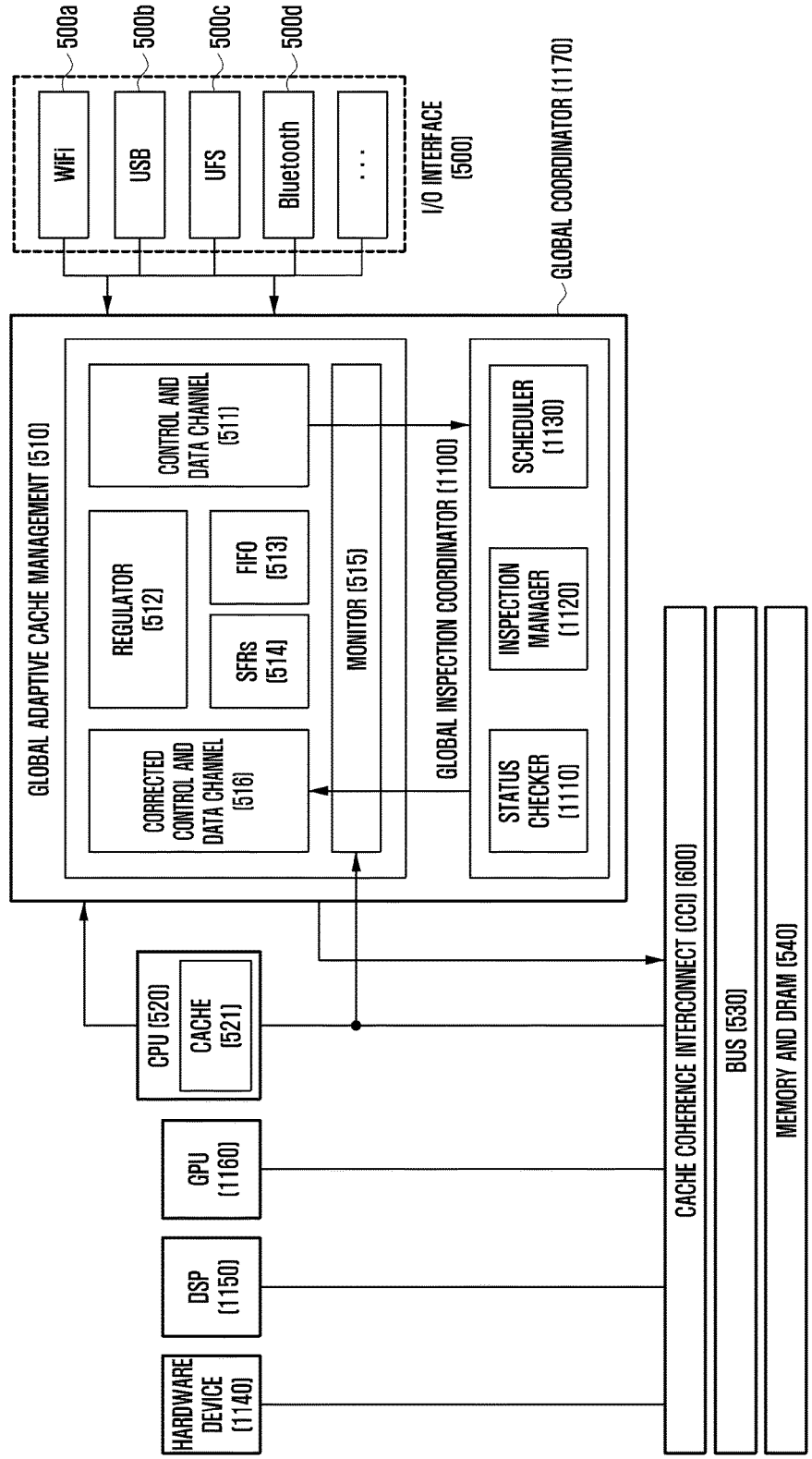
FIG. 12 is a block diagram illustrating another example of an apparatus according to an embodiment of the present disclosure.

FIG. 12 is a block diagram illustrating another example of an apparatus according to an embodiment of the present disclosure.

Referring to FIG. 12, the apparatus of FIG. 12 is different from the structure of FIG. 11 on the point that the apparatus of FIG. 12 further includes a CCI 600. The CCI is an interconnect that provides cache coherence in a multi-core system, and is connected to the bus 530 and the global adaptive cache management 510. The control and data signals that are corrected by the global adaptive cache management 510 are transmitted to the CCI 600 through the corrected control and data channel 516, and the corresponding data is transmitted to the cache 521 or the memory 540 in accordance with the priority for the data that is determined by the regulator.

Figure 13:
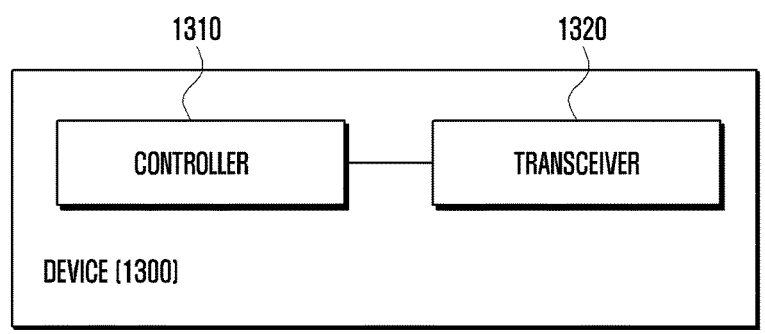
FIG. 13 is a block diagram illustrating still another example of an apparatus according to an embodiment of the present disclosure.

FIG. 13 is a block diagram illustrating still another example of an apparatus according to an embodiment of the present disclosure.

Referring to FIG. 13, a mobile device 1300 according to the present disclosure may include a controller 1310 and a transceiver 1320. The I/O interface 500, the global adaptive cache management 510, the CPU 520, the bus 530, the memory, the DRAM 540, a hardware device 1140, a DSP 1150, and a GPU 1160 as illustrated in FIGS. 11 and 12 may be included in the controller of FIG. 13. In the same manner as in FIGS. 11 and 12, the I/O interface of the embodiment corresponding to FIG. 13 is connected to the global coordinator 1170, the CPU 520 is connected to the global coordinator 1170 and the bus 530, and the bus 530 is connected to the memory 540 and the global coordinator 1170. In this case, the global coordinator 1170 may include the adaptive cache management 510 and the global inspection coordinator 1100. The transceiver 1320 may include one or more I/O units.

According to embodiments of the present disclosure, the data processing speed of a high-speed I/O device can be improved, and the performance reduction phenomenon of an application being used can be improved. Further, the network packet processing speed can be improved through removal of the inspection for unnecessary network packets, and thus the current consumption thereof can be saved and waste of the memory can be minimized.

According to an aspect of the present disclosure, a method and an apparatus for quickly processing high-speed data between devices that are connected to a network are provided. According to the method and the apparatus, the cache and the memory can be effectively used on the basis of the network state, the device state, and the information related to the I/O unit.

Although embodiments of the present disclosure have been described in the specification and drawings and specific wordings have been used, these are merely used to assist those of ordinary skill in the art to gain a comprehensive understanding of the present disclosure, and do not limit the scope of the present disclosure. It will be apparent to those of ordinary skill in the art to which the present disclosure pertains that various modifications are possible on the basis of the technical concept of the present disclosure in addition to the embodiments disclosed herein.

While the present disclosure has been shown and described with reference to certain embodiments thereof, it will be understood by those skilled in the art that various changes in form and detail may be made therein without departing from the spirit and scope of the present disclosure as defined by the appended claims and any equivalents thereof.

What is claimed is:

1. A method for processing data by a terminal implemented using at least one hardware processor, the method comprising:
    identifying, by the terminal, a plurality of inspection types for a packet;
    determining, by the terminal, an inspection type from the plurality of inspection types for the packet based on a network type for transmitting or receiving the packet and an Internet Protocol (IP) version; and
    processing, by the terminal, the determined inspection type for the packet,
    wherein the network type includes at least one of a Wi-Fi network and a cellular network, and
    wherein determining the inspection type comprises determining, by the terminal, if at least one packet is transmitted or received through an application being executed in the terminal, a size of the at least one packet is over a predetermined size that can be transmitted through an application, to process a security inspection for the packet.

2. The method of claim 1, wherein determining the inspection type further comprises determining, by the terminal, to process an Internet Protocol version 4 (IPv4) address inspection for the packet, if the packet is transmitted or received using the Wi-Fi network.

3. The method of claim 1, wherein determining the inspection type further comprises
    determining, by the terminal, to process an Internet Protocol version 6 (IPv6) address inspection for the packet, if the packet is transmitted or received using the cellular network.

4. The method of claim 1, wherein determining the inspection type further comprises:
    determining, by the terminal, to process the security inspection for the packet, if the packet is transmitted or received using a public network.

5. The method of claim 1, wherein determining the inspection type further comprises:
    determining, by the terminal, if source port information of the packet is different from predetermined source port information or if destination port information of the packet is different from a predetermined destination port information, to process the security inspection for the packet.

6. The method of claim 1, further comprising:
    determining, by the terminal, if at least two inspection types are determined, a priority for the at least two inspection types; and
    processing, by the terminal, the determined at least two inspection types for the packet based on the determined priority.

7. The method of claim 1, wherein processing the determined inspection type comprises:
    processing, by the terminal, the determined inspection type for the packet in parallel.

8. A terminal for processing data, the terminal comprising:
    a transceiver; and
    a controller implemented using at least one hardware processor configured to:
        identify a plurality of inspection types for a packet,
        determine an inspection type from the plurality of inspection types for the packet based on a network type for transmitting or receiving the packet and an Internet Protocol (IP) version, and
        process the determined inspection type for the packet,
        wherein the network type includes at least one of a Wi-Fi network and a cellular network and wherein the controller is further configured to, if at least one packet is transmitted or received through an application being executed in the terminal, a size of the at least one packet is over a predetermined size that can be transmitted through an application, determine to process a security inspection for the packet.

9. The terminal of claim 8, wherein the controller is further configured to determine to process an Internet Protocol version 4 (IPv4) address inspection for the packet, if the packet is transmitted or received using the Wi-Fi network.

10. The terminal of claim 8, wherein the controller is further configured to determine to process an Internet Protocol version 6 (IPv6) address inspection for the packet, if the packet is transmitted or received using the cellular network.

11. The terminal of claim 8, wherein the controller is further configured to determine to process the security inspection for the packet, if the packet is transmitted or received using a public network.

12. The terminal of claim 8, wherein the controller is further configured to, if source port information of the packet is different from predetermined source port information or if destination port information of the packet is different from a predetermined destination port information, determine to process the security inspection for the packet.

13. The terminal of claim 8, wherein the controller is further configured to, if at least two inspection types are determined, determine a priority for the at least two inspection types and process the determined at least two inspection types for the packet based on the determined priority.

14. The terminal of claim 8, wherein the controller is further configured to process the determined inspection type for the packet in parallel.

* * * * *